F.M. TO P.A.M. CONVERTER

Filed Feb. 12, 1968

INVENTOR.
ALFRED BUGAY
BY Alexander & Dowell
ATTORNEYS

United States Patent Office 3,553,597

Patented Jan. 5, 1971

3,553,597

F.M. TO P.A.M. CONVERTER

Alfred Bugay, Niagara Falls, N.Y., assignor to Sierra Research Corporation, a corporation of New York Filed Feb. 12, 1968, Ser. No. 704,759
Int. Cl. H03d 3/20
U.S. Cl. 329—110 2 Claims

ABSTRACT OF THE DISCLOSURE

A circuit for accepting frequency modulated (F.M.) input wherein the information resides in the spacings between zero-axis crossings of the cycles, and converting this information into pulse amplitude modulation P.A.M. output having flat step levels each of which represents the spacing between one pair of adjacent zero-axis crossings, the circuit having the advantage of providing an accurate output level for each half cycle of the F.M. input. The step levels are obtained by linearly charging a capacitor from a D.C. source, each charge accumulating substantially for the duration of the half-cycle in question, and the circuit then sampling and holding the level of the capacitor while the next F.M. half-cycle is being used to recharge the capacitor to accumulate a new level representing its duration.

This invention relates to a circuit for detecting the width in time of each half-cycle of an F.M. input signal, and developing an output pulse P.A.M. whose amplitude represents said input cycle width.

It is a major object of this invention to provide a detector circuit for converting F.M. to P.A.M. wherein only one half-cycle of the F.M. wave is needed to fully establish each output pulse level.

Another object of the invention is to provide a F.M. demodulator of the type described which is especially well adapted for use in multiplex F.M. tape recorders. Such recorders receive many inputs respectively representing diverse data, for instance phenomena being sampled, monitored, or transmitted, and they record the various data as individual half-cycle spacings between successive zero-crossings of an F.M. signal, usually although not necessarily in the form of a sine wave. The present detector circuit demodulates this F.M. signal when played back to it, and reconverts each of its individual half cycles back into successive pulses of amplitudes representing the original data, whereby for a given F.M. carrier frequency a much greater number of data samplings can be stored and recovered.

It is an object of this invention to perform the above conversions at a high rate which will not limit the ability of the multiplexer to record and play back data. Prior art detectors used for such multiplex purposes generally require about ten cycles of the F.M. signal to recover a single P.A.M. output pulse, and therefore the P.A.M. pulse rise-time is very slow as compared with the pulse rise-time of the present detector circuit.

Another object of the invention is to provide an F.M. to P.A.M. converting circuit having a high degree of conversion linearity.

Other objects and advantages of the invention will become apparent during the following discussion of the drawings, wherein.

Figure 1:
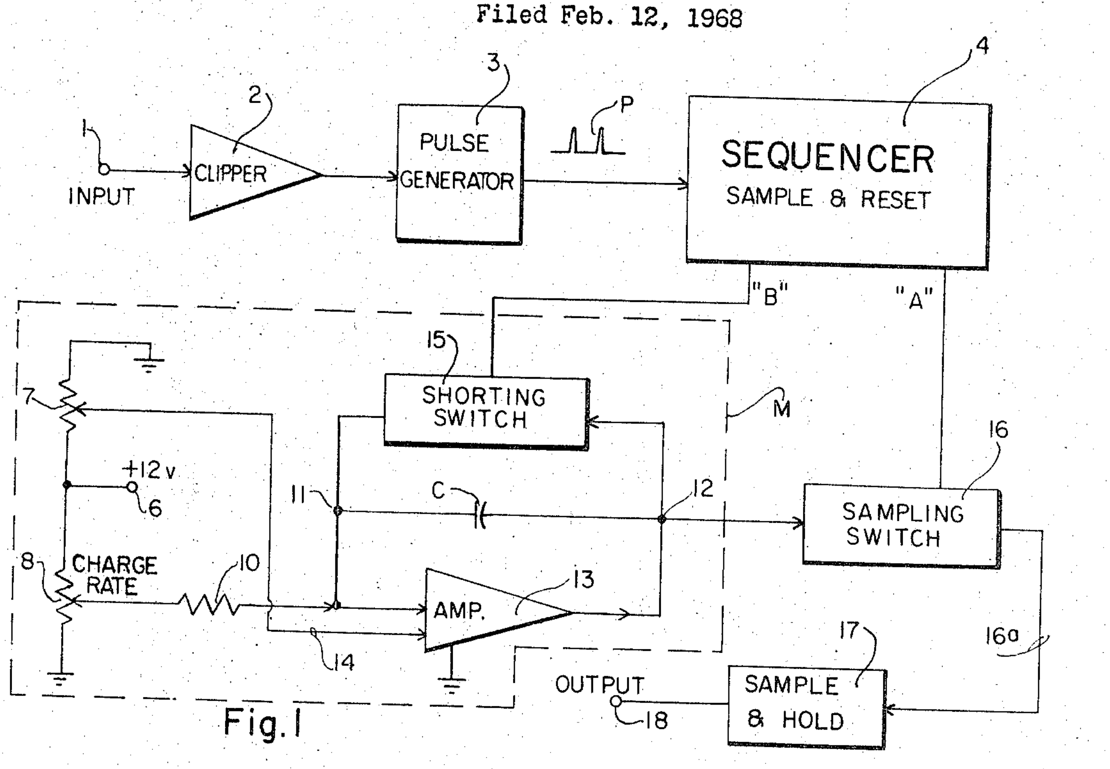
FIG. 1 is a block diagram showing a working embodiment of the present invention.
Figures 2, 3, 4, 5:
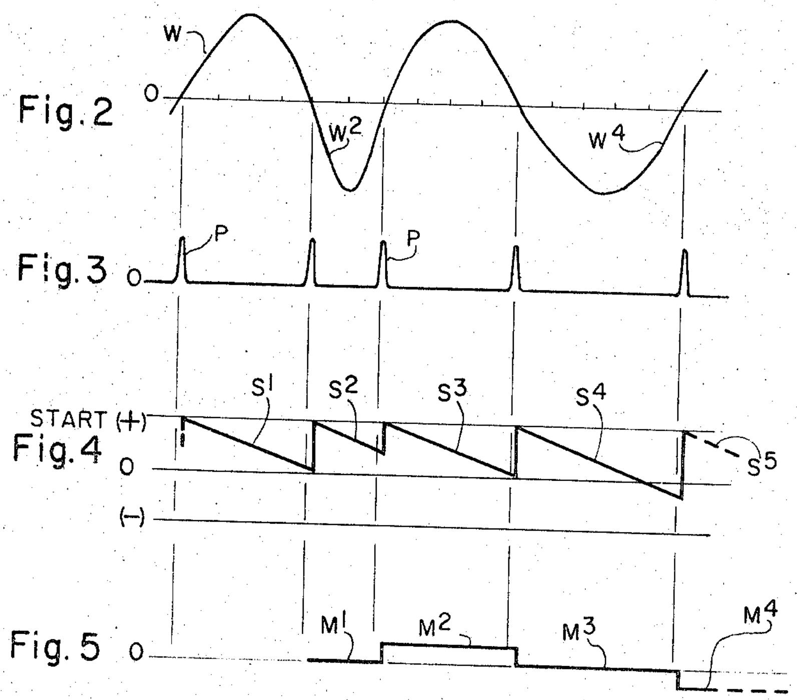
FIG. 2 is an illustration of a typical F.M. input signal.
FIG. 3 is an illustration of shaped pulses occurring at the zero-axis crossings of the wave shown in FIG. 2.
FIG. 4 is an illustration of the charging voltage across the capacitor shown in FIG. 1.
FIG. 5 is an illustration of the P.A.M. output of the circuit, corresponding with the input wave shown in FIG. 2.

Referring now to the drawings, FIG. 1 shows an illustrative embodiment of an F.M. detector of the type referred to, the detector having an input terminal 1 for receiving a frequency modulated wave W as shown in FIG. 2. The wave is fed into an amplifier-clipper 2 which delivers a squared version of the waveform W in which the zero-crossing spacings are faithfully preserved. The clipped square wave is then fed into a pulse generator circuit 3 which delivers an output impulse P of the type shown in FIG. 3 for every zero-axis crossing of the input waveform, the pulses P being erected so that they all extend in one direction, FIG. 3 showing them to be positive in polarity. The positions of these pulses represent the spacings of the zero-axis crossings of the F.M. wave W, and therefore the duration of each half cycle of the F.M. wave W.

These pulses are then fed into a sequencer 4 which, in a simple embodiment, includes two one-shots (not shown) forming a timing chain wherein the first one-shot is triggered "on" for a limited interval by a pulse P and delivers a first output on wire A, and the second one-shot is then triggered "on" by the trialing edge of the first output and delivers a second output pulse on the wire B. These two output pulses occur in rapid succession so close to each zero-axis crossing that they occupy only an insignificant portion at the beginning of each half cycle of the waveform W.

The output control-pulse signal A initiates sampling of the voltage across the capacitor C. As soon as the A signal terminates, the control-pulse signal B follows it to discharge the capacitor C and reset it to an initial level to commence the next charging cycle, as will be more fully described hereinafter.

The current to charge the capacitor C is taken from a power source represented by the plus 12 volt (with respect to ground) supply terminal 6, across which the potentiometer 8 is connected. The voltage on the terminal 11 of the capacitor C is increased in the positive direction by current taken from the potentiometer 8 through the resistor 10 and applied to the said terminal 11 of the capacitor C and the associated input terminal of an inverting operational amplifier 13 whose output terminal 12 is connected to the other side of the capacitor C. This operational amplifier serves the purpose of establishing a linear charging rate across the capacitor by current delivered to it through the resistor 10 from the potentiometer 8, the latter adjusting the rate of charge of the capacitor.

A voltage level taken from the potentiometer 7 is used to set the initial level of the capacitor C by controlling the offset at terminal 14 of the amplifier 13, just after an output B from the sequencer 4 operates the switch 15 to short-circuit the charge existing across the capacitor C. The operating sequence will be described in more detail hereinafter. The charge then accumulating across the capacitor C depends on the length of time after termination of output B during which the capacitor is permitted to charge through the resistor 10. As will be presently seen, this charging time is substantially equal to the duration of each half-cycle of the wave W as marked by the interval spacings between the pulses P, FIG. 3. At the end of each half-cycle of the wave W as marked by the inpoint 12 by closing the sampling switch 16 in response to a control signal on the wire A from the sequencer 4. Thus the voltage 12 is periodically connected to a sample and hold circuit 17 which retains the instantaneous peak voltage across the capacitor C, FIG. 4, and delivers a stepped amplitude level of the type shown in FIG. 5 to the main output terminal 18 of the circuit. A suitable sample and hold circuit for this purpose is illustrated in my co-pending application Ser. No. 665,566, filed Sept. 5, 1967, and entitled "Sample and Hold Circuit."

OPERATION

The frequency modulated wave of FIG. 2 contains information represented by the spacings between successive zero-axis crossings, for instance the two positive half-cycles of the waveform shown in FIG. 2 are four (arbitrary) spaces in overall width, the first negative half-cycle is two spaces wide, and the last negative half-cycle is five spaces wide. For present purposes, assume that the central carrier frequency of the waveform W in the absence of input modulation is four spaces wide for each half-cycle. This corresponds with zero input to the original F.M. modulator, and to zero output voltage from the present detector circuit as shown at M1, FIG. 5. Voltages which extend in the negative direction below zero level correspond with wider spacings between half-cycle cross-overs, and positive voltages which remain above the zero level correspond with narrower spacings between successive half-cycle zero cross-overs. The object of the circuit shown in FIG. 1 is to recover analog levels which extend negatively and positively with respect to a horizontal zero-axis as shown in FIG. 5 depending on whether the spacing between zero-axis cross-overs increases beyond four spaces in FIG. 1, or decreases to less than four spaces, in the present illustrative example.

The manner in which this conversion from F.M. to P.A.M. takes place is explained as follows: The waveform W of FIG. 2 is fed into terminal 1 and into amplifier-clipper 2. The clipper saturates and therefore its output is virtually a square wave which greatly increases the ease with which the zero axis crossings can be distinguished. The pulse generator 3 converts the square wave cross-overs which are fed into it into individual pulses P, which are very narrow as compared with the duration of any half-cycle, and therefore sharply define the the locations of the zero-axis crossovers. Assuming that the circuit is in operation, the instantaneous level which appears in the accumulating means M across the capacitor 12 represents the voltage to which the capacitor has been charged since the next preceding zero-axis crossing of the F.M. wave. When the next input pulse P arrives at the sequencer, an output signal appears immediately thereafter on the wire A and this signal enables the sampling switch 16 for a brief instant of time, just long enough for the sample and hold circuit 17 to adjust to the value of the voltage appearing on wire **16*a* which is the same voltage as appears at point 12 when the sampling switch 16 is closed. The sample and hold circuit 17 then holds the voltage level which it has just determined, and maintains this voltage level upon the output wire 18** until the voltage to which the capacitor C has been newly charged is ready to be again sampled.

Immediately after the actuating signal on the wire A disappears, the actuating signal on the wire B appears, and this signal operates switch 15 to render it conductive. Switch 15 short circuits the capacitor 12 to discharge the voltage stored therein and reset the accumulating means M by establishing a new starting voltage level at the capacitor C, as determined by the internal offset voltage of the amplifier 13 which is set by the potentiometer 7 and applied via the wire 14. After a brief instant the enabling signal B disappears, thereby opening switch 15 and permitting the capacitor C to begin charging by current drawn through resistor 10 from the wiper of the potentiometer 8, current of the opposite polarity being supplied to point 12 by the linear operational amplifier 13. The rate of charge of course will depend upon the setting of the wiper of the potentiometer 8, upon the resistor 10, and upon the capacity of the capacitor C. These are the factors which determine the slopes of the sawtooth voltages S1, S2, S3, and S4, whereby the ultimate voltage levels at which they arrive are determined solely by the width of each half-cycle of the waveform W, i.e., the spacings between pulses P, FIG. 3. The line marked "start (+)" across the top of FIG. 4 is determined by the position of the offset voltage potentiometer 7, and all of the successive sawtooth curves commence charging at that level. The level which arbitrarily marks zero voltage (representing the unmodulated carrier frequency of the F.M. wave W) is marked "0" in FIG. 4, and it will be noted that the curves S1 and S3 both reach the level "zero" in view of the fact that the two upper half cycles of the waveform W in FIG. 2 represent the unmodulated carrier frequency. In fact, the charging rate potentiometer 8 should be adjusted in such a way as to make the curve S1 precisely terminate at the zero axis when the F.M. wave is unmodulated.

Similarly the amplitude of the P.A.M. signal M1 shown in FIG. 5 is zero at the end of S1, and the sample and hold circuit 17 maintains this value until the next sample is taken at the end of S2. During the second half-cycle W2 the capacitor C is charged along the curve S2 and results in a final value which is on the positive side of the zero axis shown in FIG. 4 and therefore is represented by a positive P.A.M. level M2 which remains at the sampled positive amplitude level until the next sample is taken at the end of the sawtooth S3. The curve S3, again, builds up precisely to zero voltage and therefore the next pulse M3 has zero voltage level which it retains until the end of the sawtooth curve S4. The end of the sawtooth S4 goes negative with respect to the zero axis because of the greater length of the half-cycle W4 in which to charge the capacitor C in the negative direction, and therefore the P.A.M. pulse M4 persists at a negative level until the end of the next charging interval along the line S5 which half-cycle is not shown completed in the present drawing.

As pointed out above, the important thing to note is that each P.A.M. pulse level M is established completely within a time no greater than about one half-cycle of the F.M. input wave, although the pulse is actually held during the next succeeding half-cycle as described in detail above. The amplitude limits of the circuit are established by the maximum shift of the F.M. signal from its center frequency. In the negative direction, the greatest negative voltage to which the capacitor can be charged in the present system as determined by the largest spacing between adjacent half-cycles of the F.M. wave W. Conversely, the most positive value to which the capacitor C can be charged is established by the narrowest space between successive zero axis crossings of the waveform, namely the shortest charging time for the capacitor C. The circuit can easily be proportioned to make the absolute values of these limits equal, and to center these limits about the zero axis.

The present invention is not to be limited to the exact form shown in the drawings, for obviously changes can be made within the scope of the following claims.

I claim:

1. A circuit for accepting an F.M. signal and converting the duration of each half-cycle thereof into an A.M. output having an amplitude level which is dependent upon the width of the converted half-cycle, comprising:
   (a) means responsive to the F.M. signal for generating a sharp impulse representing the zero-axis crossing of each half-cycle thereof;
   (b) voltage supply means, accumulating means connected therewith for accumulating a charge whose amplitude increased with time, and resetting means for discharging said accumulating means when actuated;
   (c) sample-and-hold means operative when coupled to said accumulating means to sample the amplitude of the charge reached by said accumulating means and operative when uncoupled from said accumulating means to hold the sampled level as said A.M.

output until again coupled to said accumulating means;

(d) coupling means for selectively coupling said sample-and-hold means to said accumulating means when actuated; and (e) sequencer means responsive to each sharp impulse to actuate said coupling means to set a new level into the sample-and-hold means from the accumulating means and to then actuate said resetting means for discharging said accumulating means.

2. In a circuit as set forth in claim 1, said F.M. signal having a center carrier-frequency modulatable on both sides thereof, said accumulating means comprising a capacitor and a differential amplifier having two input terminals and an output terminal, the amplifier being connected to one end of the capacitor at its output terminal and to the other end of the capacitor at its inverting input terminal so that the ends of the capacitor are charged in opposite polarity directions; and two voltage divider means connected across said voltage supply means and each having an adjustable tap, said taps being connected respectively to the inevrting and non-inverting input terminals of said differential amplifier, the inverting terminal tap being adjustable to set the charging rate of the capacitor and the other tap being adjustable to set the level from which the capacitor begins charging when discharged by said resetting means.

References Cited

UNITED STATES PATENTS

| | | | |
|---|---|---|---|
| 2,978,615 | 4/1961 | Chater | 307—233X |
| 3,064,208 | 11/1962 | Bullock et al. | 329—107X |
| 3,277,395 | 10/1966 | Grindle et al. | 307—234X |
| 3,368,153 | 2/1968 | Garde | 307—246X |
| 3,398,366 | 8/1968 | Apfelbeck | 324—78 |
| 3,473,048 | 10/1969 | Winn | 329—107X |
| 3,454,787 | 7/1969 | Gelernter | 307—246X |

ALFRED L. BRODY, Primary Examiner

U.S. Cl. X.R.

324—78; 328—109, 140; 329—107